(12) United States Patent
DiFulgentiz

(10) Patent No.: US 9,063,555 B2
(45) Date of Patent: Jun. 23, 2015

(54) HEATING, VENTILATION AND AIR CONDITIONING SYSTEM USER INTERFACE HAVING SEASONAL PROGRAMS AND METHOD OF OPERATION THEREOF

(75) Inventor: Bobby DiFulgentiz, Frisco, TX (US)

(73) Assignee: Lennox Industies Inc., Richardson, TX (US)

( * ) Notice: Subject to any disclaimer, the term of this patent is extended or adjusted under 35 U.S.C. 154(b) by 469 days.

(21) Appl. No.: 13/432,286

(22) Filed: Mar. 28, 2012

(65) Prior Publication Data

US 2013/0151015 A1    Jun. 13, 2013

Related U.S. Application Data

(60) Provisional application No. 61/569,859, filed on Dec. 13, 2011.

(51) Int. Cl.
G05D 23/19    (2006.01)
F24F 11/00    (2006.01)

(52) U.S. Cl.
CPC ........ G05D 23/1904 (2013.01); F24F 11/0086 (2013.01); F24F 2011/0091 (2013.01)

(58) Field of Classification Search
CPC . G05B 15/02; G05D 23/1904; F24F 11/0086; F24F 2011/0091
USPC .................. 700/16, 17, 83, 87, 276, 278, 300
See application file for complete search history.

(56) References Cited

U.S. PATENT DOCUMENTS

| | | | |
|---|---|---|---|
| 4,851,708 A * | 7/1989 | Palmer | 307/141 |
| 5,329,991 A * | 7/1994 | Mehta et al. | 165/238 |
| 5,782,296 A * | 7/1998 | Mehta | 165/268 |
| 7,954,726 B2 * | 6/2011 | Siddaramanna et al. | 236/46 R |
| 8,442,693 B2 * | 5/2013 | Mirza et al. | 700/276 |
| 8,694,164 B2 * | 4/2014 | Grohman et al. | 700/276 |
| 2007/0045429 A1 * | 3/2007 | Chapman et al. | 236/46 C |
| 2009/0164049 A1 * | 6/2009 | Nibler et al. | 700/276 |
| 2010/0070089 A1 * | 3/2010 | Harrod et al. | 700/278 |
| 2010/0106333 A1 * | 4/2010 | Grohman et al. | 700/278 |
| 2010/0106334 A1 * | 4/2010 | Grohman et al. | 700/278 |
| 2015/0094862 A1 * | 4/2015 | Choi et al. | 700/276 |
| 2015/0094865 A1 * | 4/2015 | Choi et al. | 700/278 |

\* cited by examiner

*Primary Examiner* — Robert Fennema
*Assistant Examiner* — Jennifer L Norton
(74) *Attorney, Agent, or Firm* — Lennox Industries Inc.; Betty E. Ungerman; Osman Siddiq

(57) ABSTRACT

A user interface for use with an HVAC system, a method of providing service reminders on a single screen of a user interface of an HVAC system and an HVAC system incorporating the user interface or the method. In one embodiment, the user interface includes: (1) a display configured to provide information to a user, (2) a touchpad configured to accept input from the user and (3) a processor and memory coupled to the display and the touchpad and configured to drive the display and provide a plurality of seasonal programs.

6 Claims, 4 Drawing Sheets

HEATING, VENTILATION AND AIR CONDITIONING SYSTEM USER INTERFACE HAVING SEASONAL PROGRAMS AND METHOD OF OPERATION THEREOF

CROSS-REFERENCE TO RELATED APPLICATION

This application claims the benefit of U.S. Provisional Application Ser. No. 61/569,859, filed by Bias, et al., on Dec. 13, 2011, entitled "Heating, Ventilation and Air Conditioning System User Interface Having One or More of One-Touch Away Feature, Adjustable Fonts, Proportional Animation Graphics, Service Reminders on a Single Screen, Separate Programming and Manual Mode Screens, Integrated Screen/Housing Skin, Low-Profile Housing, Secure Functional Upgrade Feature and Remote Platform Access Application Associated Therewith," commonly assigned with this application and incorporated herein by reference.

TECHNICAL FIELD

This application is directed, in general, to a heating, ventilation and air conditioning (HVAC) systems and, more specifically, to an HVAC system having a user interface, such as a thermostat.

BACKGROUND

Users interact with HVAC systems through user interfaces. The most common user interface employed today is the thermostat. The most basic thermostats feature one or more dials, switches or levers and allow users to set temperatures. More elaborate thermostats feature a liquid crystal display (LCD) screen, perhaps even of the touchscreen variety, and allow users to program their HVAC systems for automatic temperature settings, configure and maintain their HVAC systems and records of historical operation data, allowing the users to gauge the performance and efficiency of their HVAC systems.

Thermostats necessarily include both temperature sensors and control circuitry within their housings. Some user interfaces do not qualify as thermostats, because while they communicate with temperature sensors and control circuitry, they do not include both within their housings.

SUMMARY

One aspect provides a user interface. In one embodiment, the user interface includes: (1) a display configured to provide information to a user, (2) a touchpad configured to accept input from the user and (3) a processor and memory coupled to the display and the touchpad and configured to drive the display and provide a plurality of seasonal programs.

Another aspect provides a method of providing seasonal programs on a user interface of an HVAC system. In one embodiment, the method includes: (1) providing information to a user with a display, (2) accepting input from the user with a touchpad and (3) providing a plurality of seasonal programs.

Yet another aspect provides an HVAC system. In one embodiment, the HVAC system includes: (1) a heat pump or a compressor having at least one stage, (2) at least one condenser coil, (3) an expansion valve, (4) at least one evaporator coil, (5) a loop of pipe interconnecting the heat pump or compressor, the at least one condenser coil, the expansion valve and the at least one evaporator coil and containing a refrigerant, (6) at least one fan configured to cause outdoor air and indoor air to blow over the at least one condenser coil and the least one evaporator coil and (7) a user interface, including: (7a) a display configured to provide information to a user, (7b) a touchpad configured to accept input from the user and (7c) a processor and memory coupled to the display and the touchpad and configured to drive the display and provide a plurality of seasonal programs.

BRIEF DESCRIPTION

Reference is now made to the following descriptions taken in conjunction with the accompanying drawings, in which.

DETAILED DESCRIPTION

Figure 1:
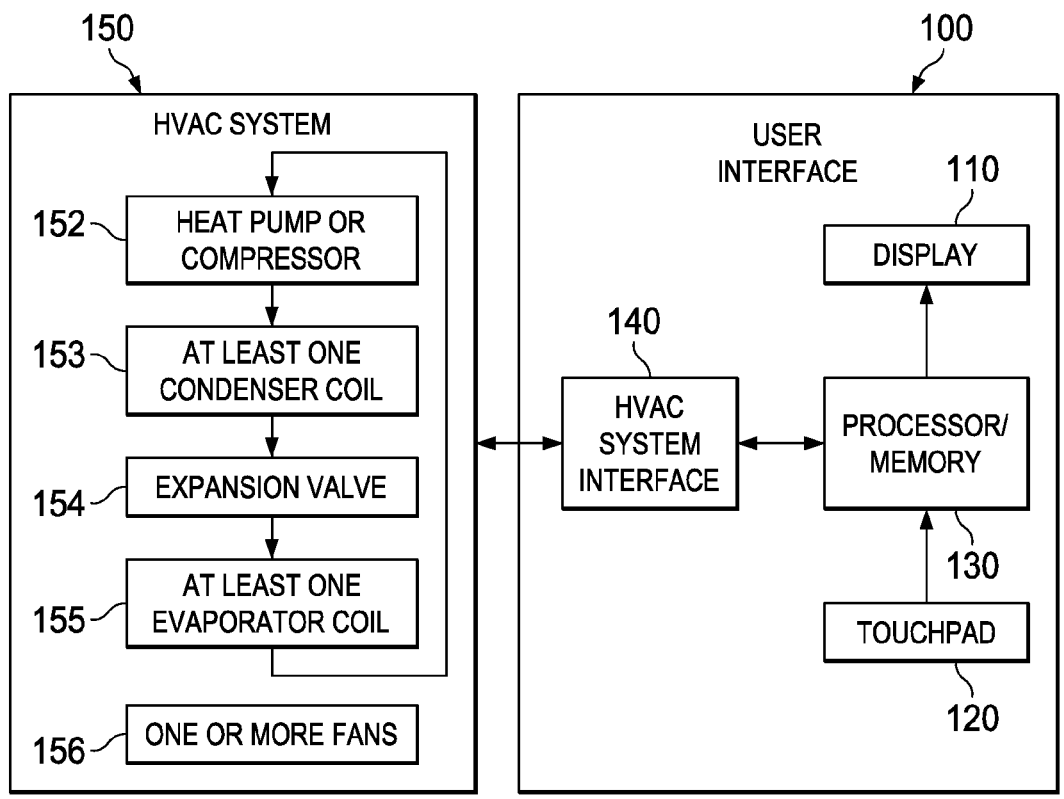
FIG. 1 is a block diagram of one embodiment of a user interface.

FIG. 1 is a block diagram of one embodiment of a user interface 100. The interface has a display 110 and a touchpad 120. The display 110 is configured to provide information to a user, and the touchpad 120 is configured to accept input from a user. A processor and memory 130 are coupled to the display 110 and the touchpad 120 to drive the display 110 and process the input from the touchpad 120. More accurately, software or firmware is loaded into and stored in the memory and, when executed in the processor, configures the processor to drive the display 110 and process the input from the touchpad 120. An HVAC system interface 140 is coupled to the processor and memory 130 and is configured to provide communication between the processor and memory 130 and the remainder of an HVAC system 150. In various embodiments, the HVAC system 150 includes one or more loops of pipe (one being shown and referenced as 151) containing a refrigerant. Each loop transports the refrigerant among a heat pump or a compressor 152 having at least one stage, at least one condenser coil 153, an expansion valve 154 and at least one evaporator coil 155. One or more fans ("blowers") 156 cause outdoor air and indoor air to blow over the at least one condenser coil 153 and the at least one evaporator coil 155 to transfer heat to or from them. Those skilled in the pertinent art are familiar with conventional HVAC systems and generally understand the many embodiments and forms they may take.

Figure 2:
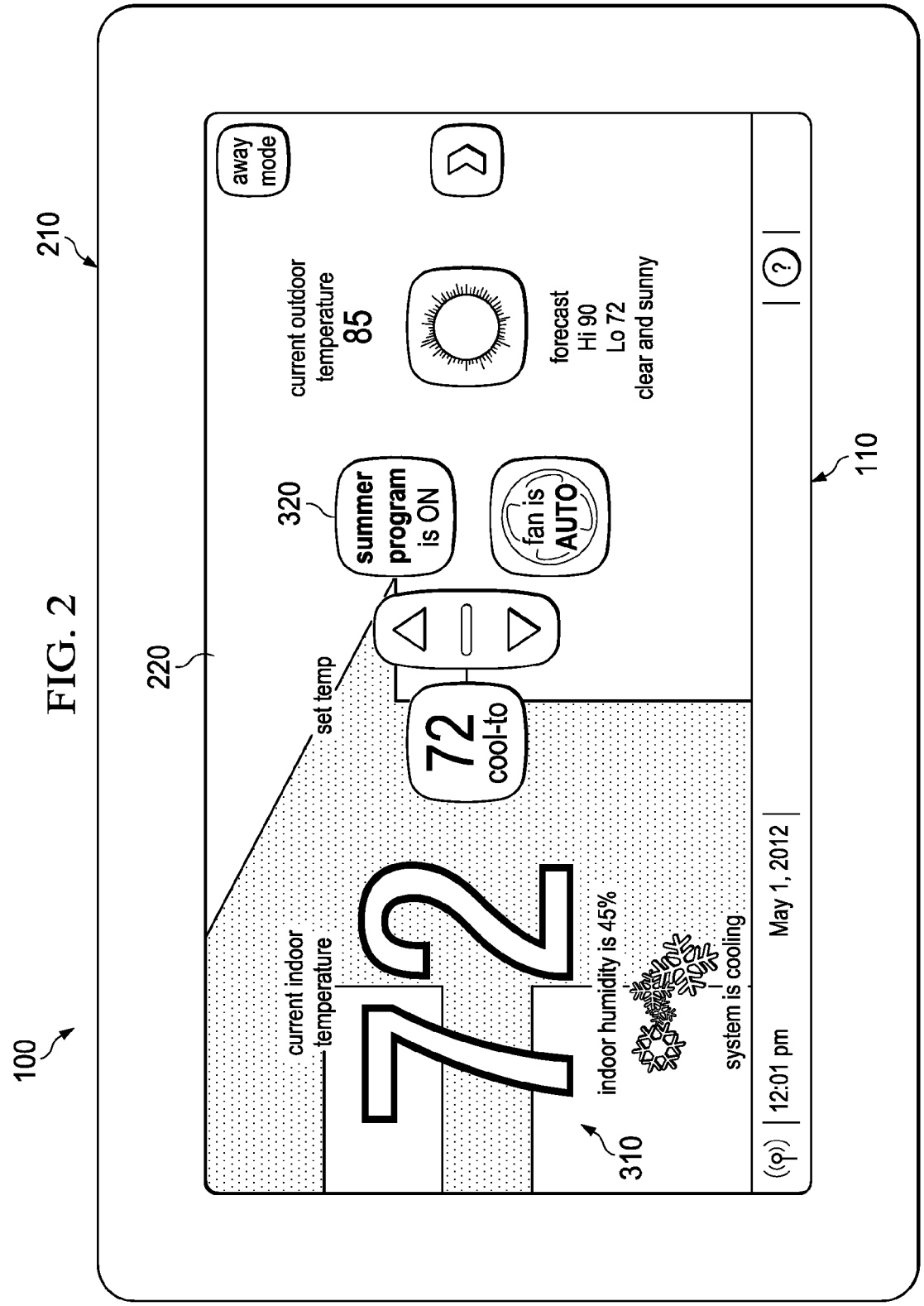
FIG. 2 is a front-side elevational view of one embodiment of a user interface.

FIG. 2 is a front-side elevational view of one embodiment of the user interface of FIG. 1. The user interface 100 has a bezel 210. The display 110 is configured to display at least one screen 220 of information for the benefit of a user (the term also including an installer or any other person interested in gaining information from the user interface 100).

Although unreferenced, the screen 220 shown in FIG. 2 includes a current temperature display portion, a setpoint temperature display portion, buttons to raise or lower the setpoint temperature, a system mode message display portion (i.e., "system is heating") and a program status message display portion (i.e., "program is on"). The screen 220 also has current date and time display portions and allows the user to display other screens (via a "press for more" message).

Introduced herein are various embodiments of a user interface having separate manual and programming mode screens.

This separate-screen feature addresses a confusing transition between programming mode and manual mode in today's user interfaces in which buttons or information associated with both modes are present on a single screen. With this feature, the programming mode is visually decoupled from the manual mode: programs are hidden in the manual mode, and manual modes are hidden in the programming mode. In conventional user interfaces, even if a user interface is running a program, a user can still see manual settings and is at least a few button clicks away from turning programming off.

In various embodiments, a user can control the mode, easily toggling between programming mode and manual mode. The screen 220 shows one embodiment of a home screen from which a user can, in the illustrated embodiment, select separate manual mode or programming mode screens. A button 320 indicates that the HVAC system is currently operating according to a program, specifically a summer program.

Figure 3A:
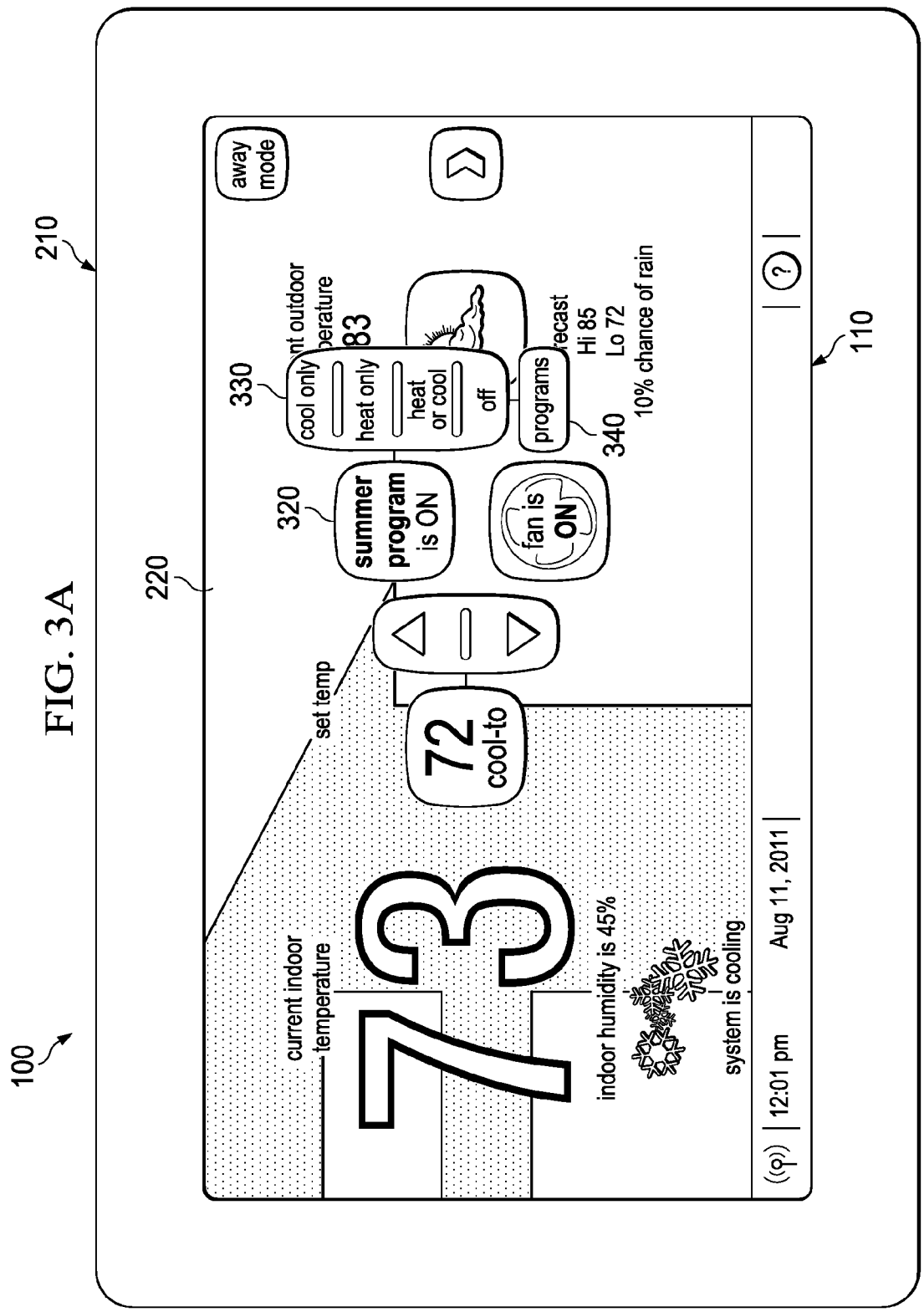
FIGS. 3A and 3B are representations of embodiments of separate manual and programming mode screens of the user interface of FIG. 2, the programming mode screens including seasonal programs.
Figure 3B:
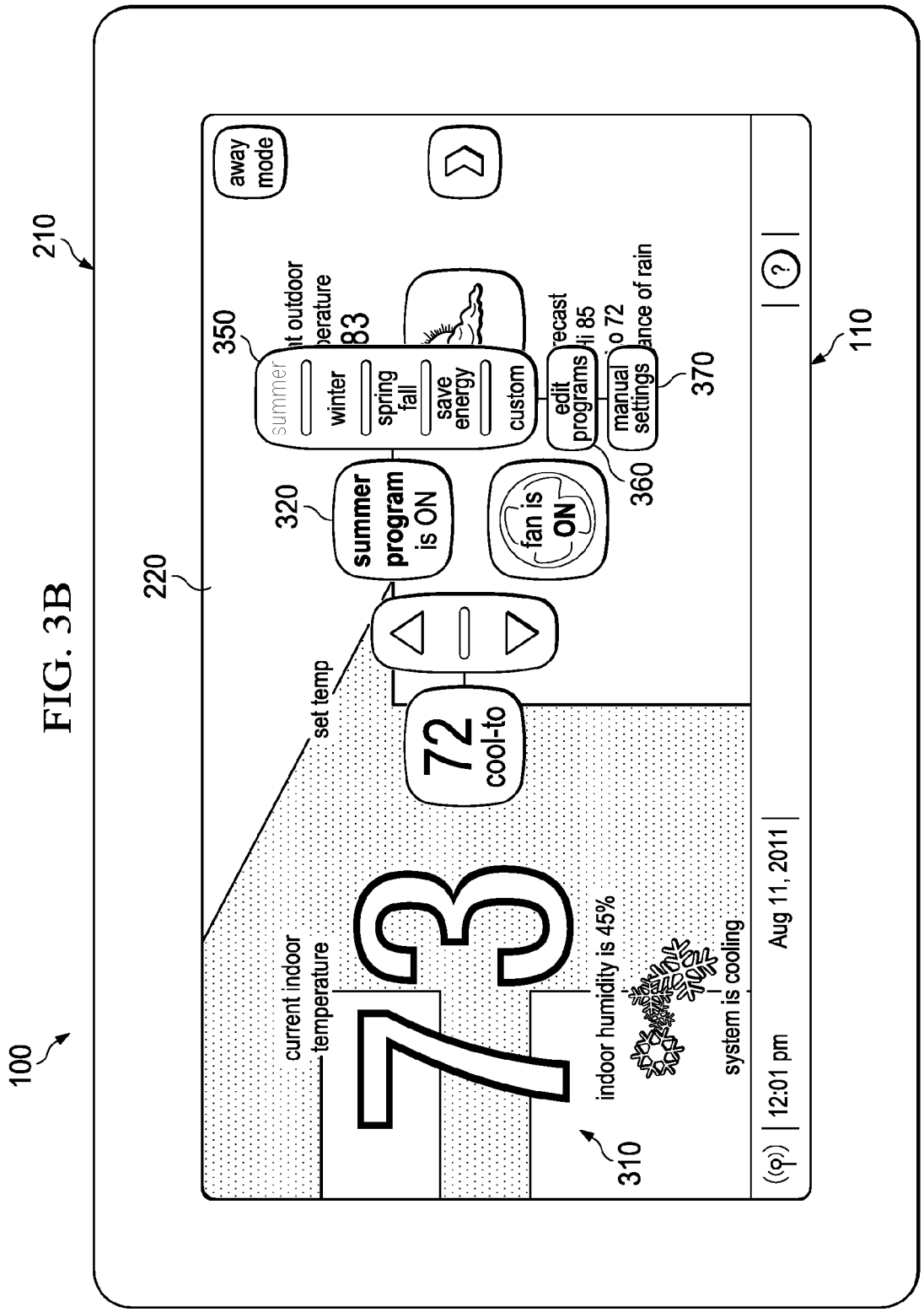

FIGS. 3A and 3B are representations of embodiments of separate manual and programming mode screens of the user interface of FIG. 2. A user can press the button 320 of the home screen of FIG. 2 to cause a menu to be presented that constitutes at least part of a manual mode screen in the illustrated embodiment. Pressing the button 320 causes a menu containing buttons 330, 340 to be presented. The buttons 330 allow the user to select among manual cooling, manual heating and manual heating and cooling (depending upon what is needed to maintain a room within a certain range of temperatures) and to turn the HVAC system off. The button 340 allows the user to select a separate programming mode screen (e.g., the programming mode screen of FIG. 3B). Various embodiments of the manual mode screen show greater or lesser numbers of manual mode buttons, but no programming buttons are available on any embodiments of the manual mode screen. Indeed, the term "manual mode screen" is defined as hiding or excluding programming mode buttons or functions; only the button 340 allowing access to the programming buttons is shown.

FIG. 3B shows a programming mode screen. A plurality of program buttons 350 are shown. The plurality of program buttons 350 includes buttons corresponding to different programs (e.g., corresponding to seasons of the year). As stated above, the button 320 already indicates that the summer program has been selected and is currently operating. Its corresponding programming buttton located at the top of the plurality of program buttons 370 is accordingly greyed out. Other programming buttons in the plurality of programming buttons 350 include a winter program button, a spring/fall program button, an energy-saving program button and a custom program button. An additional button 360 provides a way for the user to edit one or more of the programs. Also shown is a button 370 that allows the user to select a separate manual mode screen (e.g., the manual mode screen of FIG. 3A). Various embodiments of the programming mode screen show greater or lesser numbers of programming mode buttons, but no manual mode buttons are available on any embodiments of the programming mode screen. Therefore, the term "programming mode screen" is defined as hiding or excluding manual mode buttons or functions; only the button 370 allowing access to the manual buttons is shown.

If the user has selected the programming mode, the user can cycle through programs. In the embodiment of FIGS. 3A and 3B, the user can change to manual mode easily. If the user selects manual mode, user can cycle through manual modes. The user can change back to programming mode easily.

Also introduced herein are various embodiments of a user interface having seasonal programs. As described above, the programming mode screen of FIG. 3B includes buttons that correspond to different programs, which happen to correspond to seasons of the year. It has been discovered herein that users can become daunted programming user interfaces that support multiple programs. It has been further discovered that the users are frustrated that the programs are given abstract names (e.g., "Program 1," "Program 2," etc.).

Accordingly, the various embodiments described herein provide user interfaces that employ names for their programs having meanings that are familiar to the user and imply that the HVAC system is likely to operate differently in each program. More specifically, the names for the programs correspond to the seasons of the year, wherein a summer program would be expected to be run primarily during the summer and provide primarily a cooling function, a winter program would be expected to be run primarily during the winter and provide primarily a heating function, and one or more spring or autumn (also known as "fall") programs would be expected during those seasons and provide a mix of cooling and heating, perhaps with additional emphasis on humidity control.

In further certain embodiments, the seasonal programs come at least partially factory preconfigured, reducing the amount of configuration the user may want or have to do.

In more specific embodiments, the seasonal programs factory preconfigured for HVAC operation that would typically occur during that season. For example, the summer program can be factory preconfigured for cooling, perhaps to a daytime setpoint of 78° F. and a nighttime setpoint of 75° F. As another example, the winter program can be factory preconfigured for heating, perhaps to a daytime setpoint of 69° F. and a nighttime setpoint of 64° F. As still another example, a single program for both spring and autumn can be factory preconfigured for automatic selection between cooling and heating, perhaps to a daytime setpoint of 75° F. and a nighttime setpoint of 68° F.

In various embodiments, the seasonal programs are reprogrammable by the user, so users are not forced to adhere to factory preconfigurations.

In some embodiments, the seasonal programs are factory preconfigured for different climates. For example, user interfaces being shipped for installation in colder climates may be preconfigured with programs that take into account colder winter temperatures (and lower humidities requiring more attention to humidification) and cooler summer temperatures. As another example, user interfaces being shipped for installation in wetter climates may be preconfigured with programs that are more sensitive to dehumidification and greater air conditioning loads during summer.

Figure 4:
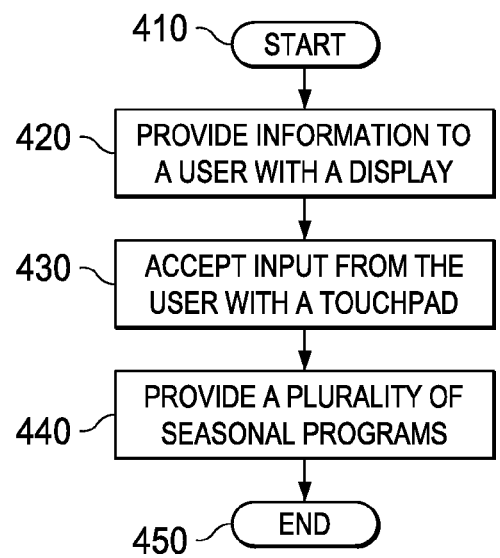
FIG. 4 is a flow diagram of one embodiment of a method of providing seasonal programs on a user interface of an HVAC system.

FIG. 4 is a flow diagram of one embodiment of a method of providing seasonal programs on a user interface of an HVAC system. The method begins in a start step 410. In a step 420, information is provided to a user with a display. In a step 430, input is accepted from the user with a touchpad. In a step 440, a plurality of seasonal programs is provided. The method ends in an end step 450.

Those skilled in the art to which this application relates will appreciate that other and further additions, deletions, substitutions and modifications may be made to the described embodiments.

What is claimed is:

1. A method of providing program buttons on a display of a thermostat of an HVAC system, wherein said program buttons correspond to a plurality of seasonal programs for said HVAC system, said method comprising:
   providing information to a user with said display of said thermostat;
   accepting input from said user on said display;

providing, via said display and in response to said input, said plurality of program buttons to said user, wherein said plurality of program buttons are identified by descriptive names that correspond to seasons of a year;

providing, via said display, a current operating button that indicates by one of said descriptive names which one of said seasonal programs is currently controlling operation of said HVAC system; and said currently operating button is a functional button, wherein said plurality of program bottoms with descriptive names that correspond to seasons of the year are provided on said display via actuation of said current operating button to further actuate corresponding seasonal programs for operating said HVAC system.

2. The method as recited in claim 1 wherein said plurality of seasonal programs are selected from the group consisting of: a summer program, a winter program, a spring program, and an autumn program.

3. The method as recited in claim 1 wherein said plurality of seasonal programs are at least partially factory preconfigured.

4. The method as recited in claim 3 wherein said plurality of seasonal programs are at least partially factory preconfigured for HVAC operation that would typically occur during a corresponding season.

5. The method as recited in claim 1 wherein said plurality of seasonal programs are reprogrammable by said user.

6. The method as recited in claim 1 wherein said plurality of seasonal programs are factory preconfigured for different climates.

\* \* \* \* \*